Patented Dec. 12, 1950

2,534,120

UNITED STATES PATENT OFFICE 2,534,120

PROCESS FOR POLYMERIZING STYRENE IN CONTACT WITH BENZOYL PEROXIDE AND DI(TERTIARY BUTYL) PEROXIDE

Sanford E. Glick, Springfield, Mass., assignor to Monsanto Chemical Company, St. Louis, Mo., a corporation of Delaware No Drawing. Application March 13, 1948, Serial No. 14,819

4 Claims. (Cl. 260—93.5)

This invention relates to a catalyst composition for the polymerization of styrene. More particularly, the invention relates to a catalyst composition for obtaining styrene polymers having a relatively low average molecular weight.

The most effective catalysts for promoting the polymerization of styrene are the peroxide catalysts and the best known of these and the most widely used is benzoyl peroxide. The emphasis has heretofore been placed on obtaining polymers of high average molecular weight such as 60,000 to 85,000 for polymers to be injection molded and 100,000 to 200,000 for objects made by the casting process.

Recently it has been discovered that polymers having an average molecular weight of less than 20,000 are particularly useful as the basis for surface coatings and as modifiers for other polymers and resins. Three ways have been found to obtain low average molecular weight polymers. The first way is to raise the polymerization temperature above 120° C. which results in a polymer which is rather highly colored and has a substantial methanol soluble component. The second method is to radically increase the amount of polymerization catalyst from a previous maximum of about 0.1% to from 0.5% to 1.0%. The products of the second process are also highly colored and contain considerable amounts of methanol soluble impurities. The third method for obtaining low average molecular weight polymers is to use substantial amounts of well known polymerization modifiers which results in material having undue softness and tack. Attempts to use a combination of two or more of the cited methods have been successful only in producing a material having an average molecular weight in the neighborhood of 25,000, at least 3% methanol soluble material and more color than desirable.

It is an object of this invention to provide a new catalyst combination.

A further object is to provide styrene polymers having an average molecular weight below 20,000 and above 10,000.

Another object is to provide a styrene polymer having an average molecular weight of below 20,000 and above 10,000 which contains less than 3% methanol soluble material and which contains a minimum of color.

These and other objects are attained by using a combination of benzoyl peroxide and di(tertiary butyl) peroxide as catalyst for the polymerization of styrene.

The following examples are given in illustration and are not intended as limitations on the scope of this invention. Where parts are mentioned, they are parts by weight.

Example I

Styrene monomer of about 99% purity and containing 0.001% tertiary buty catechol was used. 100 parts of the refined monomer were mixed with 0.5 part of benzoyl peroxide and 0.01 part of di(tertiary butyl) peroxide. The mixture was polymerized in a sealed glass vessel according to the following scredule:

2 hours at 130° C.
2 hours at 145° C.
16 hours at 165° C.

At the end of the polymerization cycle a clear, colorless polystyrene was obtained which on analysis proved to have an average molecular weight of 17,000. It contained 2.3% methanol solubles.

Example II 100 parts of refined styrene monomer were mixed with 0.3 part of benzoyl peroxide and 0.005 part of di(tertiary butyl) peroxide and the mixture was polymerized in a sealed glass container according to the same schedule as in Example I. The resulting polymer had an average molecular weight of about 19,000 and a methanol soluble content of about 1.9%.

Example III 100 parts of refined styrene monomer were mixed with 0.7 part of benzoyl peroxide and 0.005 part of di(tertiary butyl) peroxide and the mixture was polymerized as above. The resulting polymer had an average molecular weight of about 15,000 and a methanol soluble content of about 2.5%. This polymer was slightly yellow in color but it was still acceptable.

Example IV 100 parts of refined styrene monomer were mixed with 0.7 part of benzoyl peroxide and 0.05 part of di(tertiary butyl) peroxide and the mixture was polymerized as above. The resulting polymer had an average molecular weight of 13,000 and a methanol soluble content of less than 2%.

Example V 100 parts of refined styrene monomer were mixed with 0.5 part of benzoyl peroxide but no di(tertiary butyl) peroxide was used. The mixture was polymerized as above and yielded a polymer having an average molecular weight of 23,000 and a methanol soluble content of more than 3%. These results are in marked contrast with the results obtained in the previous examples in that the molecular weight is from 30 to 75% higher and the methanol soluble content is also substantially higher and in the range of non-acceptable products, i. e., a methanol soluble content of 3% or higher.

The catalyst compositions of this invention comprise benzoyl peroxide and di(tertiary butyl) peroxide in which the benzoyl peroxide is the major component. Based on 100 parts of benzoyl peroxide the di(tertiary butyl) peroxide content may vary from about 0.7 to about 7 parts. Based on 100 parts of styrene monomer the benzoyl peroxide may vary from about 0.3 part to about 0.7 part and the di(tertiary butyl) peroxide may vary between about 0.002 and 0.05 part.

The polymerization temperature may be varied between about 120° C. and about 200° C. Temperature may be applied stepwise as shown in the examples or a gradual rise in temperature may be used. It is preferable but not necessary to start the polymerization at the lower end of the temperature range and finish near the higher end of the range. Thus, it is perfectly feasible to conduct the entire polymerization at 120° C., in which case, the duration of the polymerization must be considerably extended to be complete and the methanol soluble content is likely to be on the high side. Conversely, the entire polymerization may be conducted at or near 180° C. Under these conditions the polymerization is very rapid and considerable pressure and heat is developed. The polymer resulting will be in the lower average molecular weight range and the color of the product is apt to be greater. The preferred process of this invention is to polymerize the styrene at temperatures below 150° C. for from 2 to 6 hours and then to finish the process at temperatures above 150° C. to about 200° C.

The catalyst composition and the process of this invention may also be applied to obtaining low average molecular weight polymers of styrenes substituted in the ring or in the side chain by organic and inorganic radicals as well as copolymers of styrene and/or substituted styrenes with other compounds polymerizable therewith in which the styrene or substituted styrene is the major component. For example, low average molecular weight polymers may be prepared using the catalysts and the process of this invention from mono and poly halostyrene monomers such as monochlorostyrene, dichlorostyrenes, from mono and poly alkyl styrenes such as p-ethyl, p-methyl o,p-dimethyl, p-methyl-alpha-methyl alpha-methyl styrenes, etc. Examples of compounds copolymerizable with styrene and substituted styrenes are esters of acrylic and alpha substituted acrylic acids and the alpha, beta-unsaturated dicarboxylic acids and derivatives thereof such as maleic, fumaric, citraconic, mesaconic, itaconic, aconitic acids and the nitriles, esters and amides thereof.

The catalyst compositions are particularly useful in producing styrene polymers having an average molecular weight between about 10,000 and 20,000 which contain less than 3% methanol solubles and a minimum of developed color.

It is obvious that many variations may be made in the products and processes of this invention without departing from the spirit and scope thereof as defined in the appended claims.

What is claimed is:

1. A process for preparing homopolymers of styrene having an average molecular weight of from 10,000 to 20,000 which consists essentially of polymerizing 100 parts of styrene in contact with a catalyst consisting of 100 parts of benzoyl peroxide and from 0.7 to 7.0 parts of di(tertiary butyl) peroxide, the ratio of styrene to benzoyl peroxide varying from 100:0.3 to 100:0.7, the polymerization reaction being carried out at temperatures of 120–200° C.

2. A process for preparing a homopolymer of styrene having an average molecular weight of 17,000 which consists of polymerizing 100 parts of styrene in contact with 0.5 part of benzoyl peroxide and 0.01 part of di(tertiary butyl) peroxide, by heating according to the following schedule:

2 hours at 130° C.
2 hours at 145° C.
16 hours at 165° C.

3. A process for preparing a homopolymer of styrene having an average molecular weight of about 15,000 which consists of polymerizing 100 parts of styrene in contact with 0.7 part of benzoyl peroxide and 0.005 part of di(tertiary butyl) peroxide, by heating according to the following schedule:

2 hours at 130° C.
2 hours at 145° C.
16 hours at 165° C.

4. A process for preparing a homopolymer of styrene having an average molecular weight of about 13,000 which consists of polymerizing 100 parts of styrene in contact with 0.7 part of benzoyl peroxide and 0.05 part of di(tertiary butyl) peroxide, by heating according to the following schedule:

2 hours at 130° C.
2 hours at 145° C.
16 hours at 165° C.

SANFORD E. GLICK.

REFERENCES CITED

The following references are of record in the file of this patent:

UNITED STATES PATENTS

| Number | Name | Date |
|---|---|---|
| 1,979,187 | Bindley | Oct. 30, 1934 |
| 2,136,167 | Higgins | Nov. 8, 1938 |
| 2,359,196 | Britton et al. | Sept. 26, 1944 |
| 2,367,805 | Semple | Jan. 23, 1945 |
| 2,426,476 | Vaughan | Aug. 26, 1947 |
| 2,430,993 | Rehner | Nov. 18, 1947 |
| 2,444,655 | Kroeker et al. | July 6, 1948 |